3,004,926
METHOD FOR CONTROLLING AFTER-BURNING IN THE TREATMENT OF FLUIDIZED REGENERABLE SOLIDS
Gordon D. Goering, Old Ocean, Tex., assignor to Phillips Petroleum Company, a corporation of Delaware
Filed Oct. 24, 1956, Ser. No. 618,133
10 Claims. (Cl. 252—417)

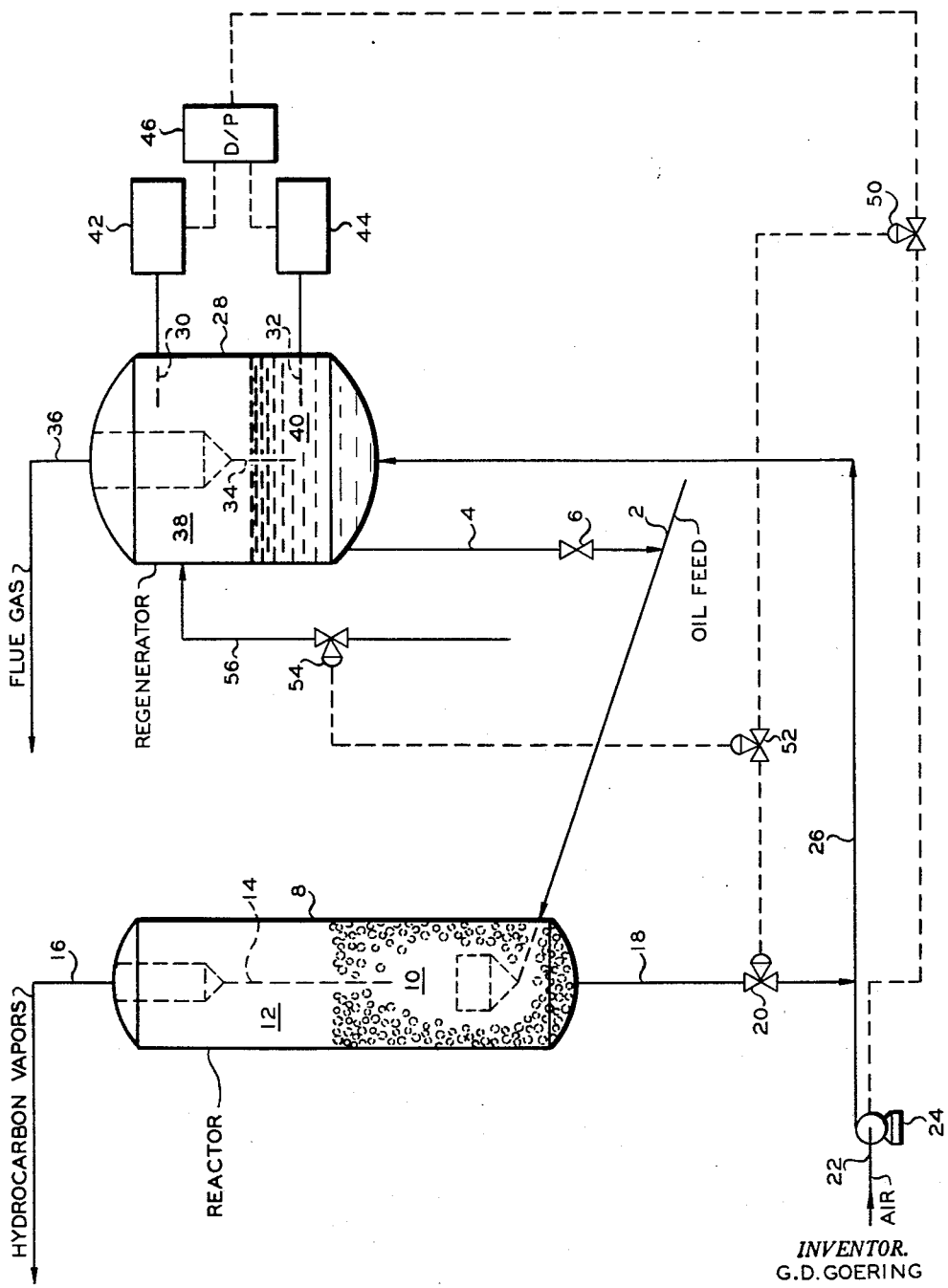

This invention relates to the treatment of regenerable solids. In one aspect it relates to method and apparatus for controlling after-burning in a regeneration system. In another aspect it relates to method and means for controlling the temperature in the dilute phase of the fluidized catalytic regeneration operation.

The phenomenon called "after-burning" has been known in the petroleum industry for many years. This undesirable feature of fluidized catalytic operation is characterized by the appearance of elevated temperatures in the dilute or lean solids phase which superposes the dense phase in a conventional fluidized bed operation. After-burning occurs when oxygen, used for example in the regeneration of catalytic solids contaminated with carbonaceous material, passes through the dense catalyst bed unconsumed and enters the dilute catalyst phase. This oxygen combines with the carbon monoxide (a product of combustion from the dense phase) to produce carbon dioxide. This reaction, which is highly exothermic, causes an excessive temperature rise in the dilute phase inasmuch as substantially all of the reaction heat must be absorbed by the gases which predominate in this phase. As a result, a small percentage of unconsumed oxygen reacting in the dilute phase can produce temperatures elevated several hundred degrees above the temperature in the dense phase bed. These temperatures, which in many instances are detrimental to the catalytic solids employed, may also have disastrous effects on the catalyst recovery system, for example, catalyst cyclones, or on the upper portion of the regeneration vessel itself.

It is an object of this invention to provide improved process and apparatus for the treatment of fluidized regenerable solids.

Another object of this invention is to provide improved method and apparatus for controlling after-burning in the treatment of fluidized regenerable solids.

Still another object of this invention is to provide improved method and apparatus for preventing or neutralizing the effects of after-burning in the treatment of fluidized regenerable solids.

Yet another object of this invention is to provide improved method and means for controlling after-burning in the treatment of fluidized contaminated catalyst, during the regeneration thereof in a conventional fluidized system.

These and other objects of the invention will become more readily apparent from the following detailed description and discussion.

The aforementioned objects are achieved broadly by measuring the temperature differential between the dense catalyst phase and the dilute catalyst phase and utilizing the differential temperature obtained to control a suitable process variable whereby said temperature differential is maintained substantially constant or within a predetermined range.

In one aspect of the invention for example when regenerating contaminated solids, the process variable controlled is the quantity of oxygen introduced to the regenerator. If the oxygen source is of a constant composition the quantity can be controlled by controlling the apparatus, such as a compressor, utilized for the introduction of the oxygen. If an oxygen containing gas of variable composition is employed the quantity of oxygen introduced to the regenerator can be controlled by varying the composition of said stream.

In another aspect of the invention the process variable controlled is the rate of solids circulation through the regenerator. This is accomplished by holding the solids level in the dense bed constant and varying the rate of solids introduction or withdrawal.

In still another aspect of the invention differential temperature control between the dilute and dense phases is provided by varying the level of the dense phase bed in the regenerator. This is accomplished either by controlling the solids introduction rate or by controlling the amount of solids withdrawn therefrom.

In yet another aspect of the invention, control of the differential temperature is provided by cooling the dilute phase. This method contemplates use of either direct or indirect cooling. If direct cooling is preferred, this can be accomplished by introducing to the dilute phase a material, such as liquid water, which is vaporizable at the temperature and pressure obtaining in the dilute phase. Preferably the cooling material is introduced as a liquid, however, the introduction of a cooling vapor is also within the scope of the invention. If indirect cooling is preferred this can be provided by cooling coils disposed within the disperse phase, a cooling material either liquid or vapor being passed through said coils.

It is within the scope of the invention to accomplish the desired result in the aforedescribed manners, individually, or in combination, as will be described in more detail hereinafter.

This invention is applicable in general to the treatment of regenerable solids which are contacted in a fluidized state with oxygen or an oxygen-containing gas for the purpose of decontaminating and/or reactivating said solids. Specifically, the invention is applicable in the treatment of catalytic solids used in the conversion of hydrocarbons, in such processes as catalytic cracking, catalytic isomerization, catalytic hydrogenation, catalytic reforming, catalytic dehydrogenation, catalytic desulfurization, etc. The invention is also used in such catalytic processes as gas synthesis, olefin polymerization, etc. Because of the widespread use of such processes, the invention finds particular application in the regeneration of hydrocarbon catalytic cracking catalysts.

The fluidized catalytic cracking of hydrocarbons is carried out conventionally in a vessel containing a dense phase bed of catalyst, superposed by a dilute phase. Hydrocarbon feed material and catalyst are introduced to the dense phase bed, the feed and/or catalyst being of sufficient temperature to promote the desired cracking in the reaction vessel. The reaction products, in gaseous form, are withdrawn overhead from the reaction zone through a suitable type of catalyst recovery apparatus which returns recovered catalyst to the dense phase bed. As the reaction proceeds, the catalyst becomes deactivated due to contamination with carbonaceous materials. In order to provide a substantially constant level of activtiy in the reaction zone, catalyst is continuously withdrawn from the reactor dense phase bed and introduced to a regeneration vessel wherein there is also maintained a dense phase bed superposed by a dilute phase. Oxygen or an oxygen-containing gas is introduced to the regeneration zone whereupon combustion of the carbonaceous deposits on the catalyst takes place and the catalyst is increased in activity. The combustion gases are withdrawn overhead from the regeneration zone through a suitable catalyst recovery system and regenerated catalyst is returned to the reaction zone.

The catalyst employed in the catalytic cracking process may be a silica-base catalyst prepared by the acid activation of bentonitic clays or a synthetic catalyst derived from silica-gel or other forms of silicic acid. The catalyst may be of the silica-alumina or silica-magnesia type with suitable additions of other active constituents such as zirconia, thoria, or the like. For the purpose of providing effective fluidization, it is desirable that the catalyst contain particles having a range of size varying from zero to about 200 microns in diameter. The hydrocarbon feed material to the catalytic reaction is usually a hydrocarbon oil such as a gas oil, either light or heavy, a naphtha, a crude oil, a reduced crude oil, residual oil or other suitable hydrocarbon material. The reaction is usually carried out in a temperature range of between about 600 and about 1000° F., the particular temperature employed depending on the catalyst used and the feed material. Usually, fluidization is provided by the hydrocarbon feed which is in the vapor state at the temperatures prevailing during the reaction. The relative quantities of catalyst and feed material are controlled to provide a superficial velocity in the catalytic reaction zone of between about 0.5 and about 5 feet per second, preferably between about 2.5 and about 3 feet per second. The reaction conditions are further defined by the catalyst to oil ratio which usually varies between about 4:1 and about 10:1 pounds per pound and the weight space velocity which usually varies between about 4:1 and about 15:1 pounds of feed per pound of catalyst present in the reactor.

The dense and dilute phases in the reactor are characterized by the great difference in their solids density. For example, the dense phase contains between about 5 and about 35 pounds of solid per cubic foot, whereas the dilute phase contains from as low as 0.001 to about 0.02 pound of catalyst per cubic foot.

The regeneration of contaminated cracking catalyst is carried out as previously stated in a system similar to that employed in the cracking reaction. Usually, the regeneration temperature is between about 700 and about 1150° F. with a temperature of between about 1000 and about 1100° F. being preferred. The concentration of solids in the dense and dilute phases and the velocities required to maintain fluidization are the same in regeneration as in the cracking operation. The amount of oxygen required for regeneration depends principally on the degree of contamination of the catalyst entering the regenerator and the level of contamination to which the catalyst is reduced during this operation. Usually, the quantity of oxygen entering the regenerator is controlled to provide a ratio of between about 30 and about 40 standard cubic feet of oxygen per 100 pounds of catalyst (1.0 percent coke burnoff).

The pressure in both operations, cracking and regeneration, varies between about 5 and about 100 pounds or higher, the particular pressure employed in each phase being dependent to a great extent on the physical location of the vessels with respect to each other. Thus, if the regenerator is at a physically higher level than the reactor, the pressure in the regenerator can be carried at a lower level than the reaction pressure and the differential overcome by the static head of fluidized catalyst flowing from the regenerator to the reactor.

In general, the above related features while given specifically for catalytic cracking will apply to other operations utilizing a regenerable solid material. The particular solids, temperatures, etc., employed in other operations in which this invention is used are well known in the art and no purpose would be served by enumerating them herein in great detail.

In carrying out the invention, in one embodiment thereof, a cracking catalyst such as a silica-alumina catalyst contaminated with carbonaceous material is introduced to a regeneration zone having disposed therein a conventional dense phase bed of catalyst superposed by a lean or dilute phase. An oxygen-containing gas such as air is introduced to the dense phase bed whereby the carbonaceous material is burned from the catalyst. Regenerated catalyst is withdrawn from the dense phase and combustion gases are removed from the dilute phase overhead from the regenerator. Fluidization is maintained in the regenerator by a combination of oxygen containing gas and the gases formed during the combustion reactions. If desired, an additional quantity of gas such as steam or recycle combustion gases can be introduced to more effectively control fluidization. A thermo-couple or other suitable temperature sensitive device is installed in each of the dense and dilute phases. The temperature in each phase produces an electro-motive force which is transmitted to a differential relay which controls the various embodiments of the invention, whereby the temperature differential between the phases is maintained substantially constant or within a predetermined range. Thus, for example, in the treatment of a catalytic cracking catalyst for the purposes of regeneration, the temperature in the dilute phase during normal operations usually exceeds the temperature in the dense phase by between about 10 and about 20° F. When after-burning occurs in the dilute phase, the temperature differential increases sharply, usually to at least about 100 to 200° F. or higher. Usually, there is sufficient carbonaceous material remaining on the catalyst leaving the dense phase and entering the dilute phase to provide the phenomenon of afterburning, therefore, the only variable involved is the amount of oxygen which escapes unconsumed from the dense into the dilute phase. It has been found in general that after-burning takes place when the amount of unconsumed oxygen reaches between about 0.7 and about 1.2 mol percent based on the total gases leaving the dense phase. Several methods can be employed to combat afterburning. In one method the oxygen feed to the regeneration zone is controlled; another relates to controlling the solids circulation rate through the regenerator; still another relates to controlling the dense phase bed level in the regenerator; and yet a fourth method relates to controlling the amount of cooling provided in the regenerator dilute phase. In the first method, namely, control of oxygen feed rate, the differential relay transmits a signal proportional to the difference in temperature in the dilute and dense phases which controls the rate at which oxygen is introduced to the regeneration zone, an increase in temperature differential providing a decrease in oxygen rate, and vice versa. If the oxygen is introduced as air, such as by an air compressor, the signal can be used to control the discharge rate from the air compressor. If, on the other hand, the oxygen containing gas introduced to the regenerator comprises a mixture of air or oxygen, and recycled flue gases from the regenerator, the signal can be used to control either the quantity of flue gas recycled or the quantity of oxygen or oxygen-containing gas.

When it is desired to control catalyst circulation rate through the regenerator, the signal from the differential relay can control the rate of contaminated catalyst withdrawal from the reactor or the rate of withdrawal of regenerated catalyst from the regenerator. If the temperature differential increases, thereby indicating afterburning, it is desirable that the solids rate through the regenerator be increased, thereby in effect decreasing the oxygen to catalyst ratio and reducing the amount of unconsumed oxygen in the dilute phase. If, on the other hand, the temperature differential decreases, thus indicating a possible deficiency of oxygen in the regenerator, this can be remedied by reducing the catalyst circulation rate. In either instance the level of the dense phase in the regenerator is maintained constant.

Control of afterburning by variation in the catalyst bed level in the regenerator is provided by increasing or decreasing the catalyst introduced to or withdrawn from the regenerator for a sufficient period of time to establish the desired bed level, which is then maintained constant until the temperature differential requires either a reversion to the former level or the establishment of a new level. If the signal from the differential relay increases in magnitude the bed level is increased, and vice versa.

It should be noted that each of the three methods just described are effective not only in combating afterburning, but also function to prevent oxygen deficiencies in the regenerator.

As previously stated, when controlling after-burning by cooling the dilute phase, the cooling is preferably accomplished by introducing a volatile liquid to said phase, although as noted, other methods can be employed. It is to be noted that, while the methods previously discussed act to prevent after-burning by limiting the amount of unconsumed oxygen in the dilute phase, cooling the dilute phase merely nullifies the detrimental effects of after-burning by reducing the dilute phase temperature. Thus, this method does nothing to correct the basic misoperation which must be compensated for either manually or by one of the means previously discussed. The principal advantage offered by cooling is the rapidity of response to a variation in the temperature differential. Thus, this method can be used in conjunction with any of the other three methods if the temperature differential should increase with exceptional rapidity. For example, the instrumentation system can be arranged so that control of the oxygen rate is used in the preliminary stages when the differential temperature list increases; however, if the differential temperature increases too rapidly for control of the oxygen to be effective, then at some higher temperature differential, introduction of a cooling fluid to the dilute phase can be provided.

It should be obvious to one skilled in the art that various arrangements of one, two or more of the methods proposed can be provided. It is, therefore, within the scope of the invention to provide temperature control by using each or any of the methods in conjunction with the other methods.

In order to more clearly describe the invention and provide a better understanding thereof reference is had to the accompanying drawing which is a diagrammatic illustration of a catalytic cracking unit including a reactor and regenerator, and instrumentation suitable for carrying out the invention. Referring to the drawing, a hydrocarbon oil feed such as a heavy gas oil is introduced through conduit 2 to a reactor 8 wherein there is maintained a dense phase bed of cracking catalyst 10, superposed by a dilute phase 12. During the reaction which occurs, the gas oil is converted to both heavier and lighter components the latter predominating in materials boiling in the gasoline range. As a result of the reaction carbon deposition on the catalyst takes place whereby the catalyst is gradually reduced in activity. In order to maintain a desired level of activity it is necessary that contaminated catalyst be continuously removed from the reactor and more active catalyst be introduced thereto. In this specific process, removal of contaminated catalyst is provided by withdrawing catalyst from the bottom of the reactor through conduit 18. A quantity of catalyst equal to that withdrawn is introduced to the oil feed from the regenerator through conduit 4 and valve 6. The vapor products of the catalytic reaction are withdrawn overhead from the reactor through conduit 16. Before their removal these vapors which contain entrained catalyst particles are passed through a conventional catalyst removal apparatus, such as, for example, a cyclone 14.

In view of the cost of the catalyst employed, it is desirable to treat the contaminated catalyst for the purpose of reactivating it, rather than continuously introduce new catlyst to the reaction system. For this purpose there is provided a regenerator 28 wherein the contaminated catalyst is contacted with oxygen at an elevated temperature. Contaminated catalyst withdrawn from the reactor through conduit 18 is passed through a control valve 20, entrained in air from conduit 22 and compressor 24 and introduced through conduit 26 to the bottom of said regenerator. Within the regenerator there is maintained a dense phase bed of regenerated catalyst 40 superposed by a dilute phase 38. Upon entering the regenerator, the catalyst enters this dense phase bed which is maintained at a temperature of about 1100° F. and carbonaceous material is burned from the entering catalyst whereby the catalyst is substantially restored in activity. As in the reactor, the gaseous products of reaction are passed overhead from the regenerator through a catalyst recovery apparatus 34, leaving the regenerator through conduit 36. Regenerated catalyst is withdrawn from the dense phase bed through conduit 4 and introduced to the oil feed in conduit 2 at a rate sufficient to balance the quantity of contaminated catalyst withdrawn from the reactor. In conjunction with the regenerator, there is provided an instrumentation arrangement which comprises thermocouples 30 and 32 installed in the regenerator dilute and dense phases, respectively, temperature transmitter recorders 42 and 44, DP cell 46, three-way valves 50 and 52 and control valves 20 and 54. The purpose of this control ssytem is to provide means for controlling the temperature differential between the dense and dilute phases whereby after-burning in the dilute phase can be either prevented or the effects thereof can be nullified. In operation the thermocouples 30 and 32 produce electromotive forces which are proportional to the temperatures in each of the two phases, these signals are transmitted to temperature recorder transmitters 42 and 44, for example, Brown Circular Chart Air-o-Line Potentiometer Controllers as described in bulletin 15–4 of the Brown Instrument Company, which convert the electrical signal from the thermocouples to pneumatic signals. These signals, in turn, are transmitted to a differential measuring device 46, such as a DP cell as described in the General Catalog of Industrial Instrumentation, Bulletin 450 of the Foxboro Company, page 23, which transmits a signal proportional to the differential pressure to the various points indicated on the drawing.

Control of the differential temperature can be provided in various manners. In one method, the air signal from instrument 46 is utilized to regulate the regeneration air introduced through compressor 24. This can be accomplished by controlling the governor-control assembly on the air blower, or by controlling steam or electrical input depending on the type of compressor used. Thus, if, for example, the temperature in the dilute phase should increase above the normal operating level, the increase in electro-motive force indicated by thermocouple 30 and converted to a pneumatic impulse in instrument 42 provides an increase in the pressure differential signal transmitted from 46 to compressor 24, whereby the quantity of air introduced to the regenerator is reduced. The decrease in air stops the afterburning and the temperature in the dilute phase then returns to normal. Conversely, if the dilute phase temperature decreases, the instrumentation arrangement operates to provide an increase in the quantity of the air to the regenerator whereby the dilute phase temperature is again returned to normal.

In another embodiment of this invention, the differential in temperature between the dilute and dense phases is controlled by controlling the catalyst circulation rate through the regenerator. This is accomplished by controlling the quantity of catalyst introduced to the regenerator from the reactor by utilizing the differential pressure impulse from 46 to actuate control valve 20 in line 18. An independent control means (not shown) or manual control is utilized to maintain the catalyst level in the regenerator. Since a closed system is being utilized control of the level in one vessel automatically establishes the level in the other vessel. In operation, after-burning in the regenerator actuates the control system which increases the flow of catalyst through valve 20, thereby increasing the quantity of catalyst entering and passing through the regenerator. This increases the quantity of carbon present in the regenerator, thus, in effect, nullifying the excessive oxygen present therein. Conversely, a deficiency of oxygen in the regenerator whereby the temperature in the dilute phase is reduced to below normal is compensated by reducing the rate of catalyst circulation through the regenerator.

In another embodiment, control of after-burning and oxygen deficiency in the regenerator is provided by controlling the level of the dense phase solids bed therein. In this method, the quantity of solids introduced from the reactor to the air entering the regenerator is also controlled by means of control valve 20, however, in this instance, the level in the regenerator is not maintained constant; thus, if after-burning occurs, the quantity of catalyst introduced to the air in conduit 26 is increased whereby the level in the regenerator increases accordingly. Increasing the level in the regenerator in effect increases the quantity of carbonaceous material present therein which nullifies the excessive oxygen and serves to reduce the dilute phase temperature to normal.

In still another embodiment of the invention, control of after-burning is provided by controlling the quantity of a coolant introduced to the dilute phase of the regenerator. In this method, the pressure differential signal from instrument 46 is transmitted through three-way valves 50 and 52 to control valve 54 through which a vaporizable liquid, such as water, is introduced to the regenerator dilute phase.

In operation, after-burning in the dilute phase actuates control valve 54, which opens, allowing sufficient water to enter the dilute phase to return the temperature therein to normal. The flow of water continues until such time as the conditions which produced the after-burning are remedied.

By virtue of the instrumentation arrangement shown, in particular, the three-way valves 50 and 52, it is possible to utilize one or more of the control methods discussed, or any combination thereof. For example, in one arrangement, it is possible to control either oxygen feed rate, catalyst circulation rate or solids bed level in the regenerator to compensate for minor changes in the dilute phase temperature and to use in conjunction therewith, cooling of the regenerator dilute phase if the temperature in said phase exceeds a set maximum.

The invention has been specifically described with reference to the operation and control of a catalytic cracking process. It is not intended, however, that this be taken in any limiting sense and the invention is sufficiently broad in scope to include control of other processes as previously discussed. Also, it is not intended that the invention be limited to the particular vessel arrangement or particular instruments noted in the discussion of the drawing. Other suitable conventional vessel arrangements and other instruments well known to those skilled in the art are also contemplated within the scope of the invention.

The following specific example is presented to illustrate an application of one embodiment of the invention on a commercial scale.

*Example*

A straight run gas oil having an API gravity of about 35.0 is catalytically cracked at a rate of about 350 barrels per hour in the presence of a synthetic silica-alumina catalyst under the following conditions:

| | | |
|---|---|---|
| Temperature | °F | 910 |
| Pressure | p.s.i.g. | 10 |
| Weight hourly space velocity | lb./hr./lb. | 8 |
| Catalyst-to-oil ratio | lb./lb. | 6:1 |
| Bed density | lb./ft.$^3$ | 30 |

Spent catalyst is withdrawn from the dense phase bed of the reactor, entrained in air and introduced to a regenerator wherein carbonaceous material is removed by burning. The regeneration operation is carried out under the following conditions:

| | | |
|---|---|---|
| Temperature (bed) | °F | 1,100 |
| Pressure | p.s.i.g. | 6 |
| Air-to-catalyst ratio (catalyst (1 percent coke burnoff)) | s.c.f./lb. | 1.6 |
| Bed density | lb./ft.$^3$ | 30 |
| Catalyst circulation rate | tons/hr | 625 |

In conjunction with the reactor and regenerator there is provided an instrumentation system like that shown in the aforedescribed drawing. In this particular example three-way valve 50 is open only to air compressor 24. During normal operation the temperature in the dense phase of the regenerator is about 1110° F. and the temperature in the dilute phase is about 1110° F., thus providing a temperature differential of about 10° F. Due to a change in composition of the feed material entering the reactor, the quantity of carbon deposited on the catalyst during the catalytic reaction is decreased. Shortly thereafter catalyst withdrawn from the reactor reaches the regenerator, thus reducing the amount of carbonaceous material in the regenerator dense phase. As a result, less oxygen is consumed in the regenerator and the quantity of free oxygen entering the dilute phase thereof is increased to the point about 1.0 mol percent where after-burning occurs. Immediately, the temperature in the dilute phase begins to increase thereby increasing the temperature differential between the two phases. In the manner described in the discussion of the drawing, the instrumentation system produces an increased pressure signal which is transmitted to the governor on compressor 24. As a result, the compressor is slowed down and the air entering the regenerator is reduced to about 1.56 s.c.f. of air per pound of catalyst. This eliminates excessive oxygen break-through into the dilute phase whereupon the temperature therein returns to normal. As long as the composition of the feed entering the reactor remains changed, the rate of air introduction to the regenerator will remain at a reduced rate, whereby control of the dilute phase temperature at the desired level is maintained. A return in feed composition to the reactor to normal will be indicated by a drop in the temperature in the dilute phase, thus indicating a deficiency of oxygen in the regenerator which will be compensated for by an increase in the quantity of air delivered by compressor 24.

Having thus described the invention by providing a specific example thereof, it is to be understood that no undue limitations or restrictions are to be imposed by reason thereof and that many modifications and variations are within the scope of the invention.

I claim:
1. In a process for the regeneration of contaminated solids in the presence of oxygen in which the regeneration is carried out in a fluidized state in a regeneration zone containing a dense phase bed superposed by a dilute phase in which the regeneration process variables include oxygen feed rate, dense phase bed level, solids circulation rate, heat removal rate and combinations thereof and in which the temperature of the dilute phase relative to the dense phase varies due to after-burning in the dilute phase, the improvement which comprises measuring the temperature in each phase and adjusting at least one of said process variables responsive to a change in the difference between said temperatures whereby a predetermined temperature differential between the two phases is maintained.

2. The process of claim 1 in which the predetermined temperature differential is maintained by adjusting the quantity of oxygen fed to the regeneration zone responsive to and inversely proportional to the difference in the temperatures in the dilute and dense phases.

3. The process of claim 1 in which the predetermined temperature differential is maintained by adjusting the catalyst circulation rate through the regeneration zone responsive to and directly proportional to the difference in the temperatures in the dilute and dense phases.

4. The process of claim 1 in which the predetermined temperature differential is maintained by adjusting the catalyst bed level in the regeneration zone responsive to and directly proportional to the difference in the temperatures in the dilute and dense phases.

5. The process of claim 1 in which the predetermined temperature differential is maintained by adjusting heat removal from the dilute phase responsive to and directly proportional to the difference in the temperatures in the dilute and dense phases.

6. In a process for the regeneration of contaminated catalyst solids in the presence of oxygen in which the regeneration is carried out in a fluidized state in a regeneration zone containing a dense phase bed superposed by a dilute phase, in which the regeneration process variables include oxygen feed rate, dense phase bed level, solids circulation rate, heat removal rate and combinations thereof and in which the temperature of the dilute phase relative to the dense phase varies due to after-burning in the dilute phase, the improvement which comprises measuring the temperature in each phase and adjusting at least one of said process variables responsive to a change in the difference between said temperatures whereby a predetermined temperature differential between the two phases is maintained and removing additional heat from the dilute phase when said temperature differential exceeds a second predetermined maximum which is higher than the aforesaid temperature differential.

7. The process of claim 6 in which the additional heat is removed by introducing into the dilute phase a vaporizable liquid.

8. The process of claim 6 in which the adjusted regeneration process variable is the oxygen feed rate to the regeneration zone.

9. The process of claim 6 in which the adjusted regeneration process variable is the rate of circulation of solids through the regeneration zone.

10. The process of claim 6 in which the adjusted regeneration process variable is the solids bed level in the regeneration zone.

References Cited in the file of this patent

UNITED STATES PATENTS

| | | |
|---|---|---|
| 2,073,650 | Prickett | Mar. 16, 1937 |
| 2,374,660 | Belchetz et al. | May 1, 1945 |
| 2,386,491 | McOmie | Oct. 9, 1945 |
| 2,431,455 | Blanding | Nov. 25, 1947 |
| 2,432,520 | Ferro | Dec. 16, 1947 |
| 2,518,693 | Jahnig | Aug. 15, 1950 |
| 2,545,162 | Muly et al. | Mar. 13, 1951 |
| 2,696,461 | Howard | Dec. 7, 1954 |
| 2,707,701 | Hemminger | May 3, 1955 |
| 2,735,822 | Campbell et al. | Feb. 21, 1956 |
| 2,756,216 | Yoder | July 24, 1956 |
| 2,783,187 | Odell | Feb. 26, 1957 |
| 2,884,376 | Freeman | Apr. 28, 1959 |